United States Patent
Yamamoto et al.

(10) Patent No.: US 6,663,691 B2
(45) Date of Patent: Dec. 16, 2003

(54) METHOD OF RECOVERING ENRICHED GASEOUS OXYGEN

(75) Inventors: Morihiko Yamamoto, Hyogo (JP); Hiroaki Sasano, Hyogo (JP); Kazuo Haruna, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 10/203,842

(22) PCT Filed: Dec. 14, 2001

(86) PCT No.: PCT/JP01/11008
§ 371 (c)(1),
(2), (4) Date: Aug. 13, 2002

(87) PCT Pub. No.: WO02/49959
PCT Pub. Date: Jun. 27, 2002

(65) Prior Publication Data
US 2003/0010207 A1 Jan. 16, 2003

(30) Foreign Application Priority Data
Dec. 19, 2000 (JP) ............ 2000-385189

(51) Int. Cl.$^7$ ............ B01D 53/053
(52) U.S. Cl. ............ 95/100; 95/103; 95/105; 95/130
(58) Field of Search ............ 95/96–98, 100–105, 95/130

(56) References Cited

U.S. PATENT DOCUMENTS

| | | | |
|---|---|---|---|
| 3,279,153 A | * 10/1966 | Basmadjian et al. | 95/105 |
| 3,788,036 A | 1/1974 | Lee et al. | |
| 4,561,865 A | * 12/1985 | McCombs et al. | 95/96 |
| 4,892,566 A | * 1/1990 | Bansal et al. | 95/98 |
| 5,032,150 A | * 7/1991 | Knaebel | 95/14 |
| 5,370,728 A | * 12/1994 | LaSala et al. | 95/101 |
| 5,518,526 A | * 5/1996 | Baksh et al. | 95/100 |
| 5,565,018 A | 10/1996 | Baksh et al. | |
| 5,658,371 A | * 8/1997 | Smolarek et al. | 95/101 |
| 5,702,504 A | * 12/1997 | Schaub et al. | 95/101 |
| 5,755,856 A | 5/1998 | Miyake et al. | |
| 5,772,737 A | * 6/1998 | Andreani et al. | 95/98 |
| 5,906,674 A | * 5/1999 | Tan et al. | 95/98 |
| 5,961,694 A | * 10/1999 | Monereau et al. | 95/98 |

(List continued on next page.)

FOREIGN PATENT DOCUMENTS

| | | |
|---|---|---|
| EP | 0 641 591 A1 | 3/1995 |
| EP | 0 705 636 A1 | 4/1996 |
| EP | 0 771 583 A1 | 5/1997 |
| JP | 8-239204 | 9/1996 |
| JP | 9-29044 | 2/1997 |
| JP | 2000-237522 | 9/2000 |

*Primary Examiner*—Robert H. Spitzer
(74) *Attorney, Agent, or Firm*—Merchant & Gould P.C.

(57) ABSTRACT

A process is provided for recovering oxygen-rich gas by enriching gaseous oxygen contained in crude gas by a single-tank PSA process which utilizes a single adsorption tower loaded with an adsorbent. A cycle is repeated including introducing crude gas into the adsorption tower, desorbing unnecessary components from the adsorbent, introducing washing gas into the adsorption tower for discharging the remaining gas from the adsorption tower, and raising the internal pressure of the adsorption tower. The desorbing includes recovering semi-enriched oxygen gas existing in the adsorption tower after finishing of the adsorption for retention in a recovery tank. The introduction of washing gas includes introducing part of the semi-enriched oxygen gas existing in the recovery tank into the adsorption tower as the washing gas. Raising the internal pressure includes introducing the rest of the semi-enriched oxygen gas retained in the recovery tank into the adsorption tower.

6 Claims, 5 Drawing Sheets

U.S. PATENT DOCUMENTS

| | | | | |
|---|---|---|---|---|
| 6,010,556 A | * | 1/2000 | Petit | 95/98 |
| 6,048,384 A | * | 4/2000 | Smolarek | 95/98 |
| 6,051,052 A | * | 4/2000 | Monereau et al. | 95/97 |
| 6,071,328 A | * | 6/2000 | Petit et al. | 95/98 |
| 6,096,115 A | * | 8/2000 | Kleinberg et al. | 95/101 |
| 6,102,985 A | * | 8/2000 | Naheiri et al. | 95/101 |
| 6,146,447 A | * | 11/2000 | Sircar et al. | 95/101 |
| 6,156,101 A | * | 12/2000 | Naheiri | 95/101 |
| 6,171,371 B1 | * | 1/2001 | Derive et al. | 95/98 |
| 6,183,538 B1 | * | 2/2001 | Naheiri | 95/98 |
| 6,287,366 B1 | * | 9/2001 | Derive et al. | 95/100 |
| 6,425,938 B1 | * | 7/2002 | Xu et al. | 95/100 |

* cited by examiner

| Step NO. | 1 | 2 | 3 | 4 | 5 | 6 |
|---|---|---|---|---|---|---|
| Step | Adsorbing | Desorbing (Purge・Gas Recovery) | Desorbing (Purge) | Washing (Product Gas) | Washing (Recovered Gas) | Pressurization |
| Valve 5a | Open | Close | Close | Close | Close | Close |
| Valve 5b | Close | Close | Close | Open | Close | Close |
| Valve 5c | Close | Open | Close | Close | Open | Open |
| Valve 5d | Open | Close | Close | Close | Close | Open |
| Valve 5e | Open | Close | Open | Close | Close | Open |
| Valve 5f | Close | Open | Open | Open | Open | Close |
| Valve 5g | Close | Open | Open | Open | Open | Close |
| Valve State | | | | | | |

| | Example 1 | Example 2 | Example 3 | Example 4 | Example 5 | Comparative Example 1 | Comparative Example 2 |
|---|---|---|---|---|---|---|---|
| Adsorbent | Li−X zeolite molecular sieve | | | | | | |
| Highest Pressure in Adsorption | 50kPa | | | | | | |
| Lowest Pressure in Desorption | −50kPa | | | | | | |
| Tower Gas Recovering Time | 5 sec. | | | | | | |
| Pressure Variation in Desorption (STEP 2)[kPa] Adsorption Tower | −25 →2 | −27 →2 | −23 →4 | −31 →−7 | −22 →10 | −35 →0 | −30 →0 |
| Pressure Variation in Desorption (STEP 2)[kPa] Recovery Tank | 50→5 | | | | | | |
| Pressure Variation in Washing (STEP 5)[kPa] Adsorption Tower | −50→−45 | −50→−47 | −50→−43 | −50→−51 | −50→−42 | −50→−40 | None |
| Pressure Variation in Washing (STEP 5)[kPa] Recovery Tank | 2 →−21 | −2 →−22 | 4 →−20 | −7 →−22 | 10 →−20 | 0 →−35 | None |
| Pressure variation in Pressurization (STEP 6)[kPa] Adsorption Tower | −45→−30 | −47→−32 | −43→−28 | −51→−36 | −42→−27 | None | −50→−35 |
| Pressure variation in Pressurization (STEP 6)[kPa] Recovery Tank | −21 →−25 | −22 →−27 | −20 →−23 | −22 →−31 | −20 →−22 | None | 0 →−30 |
| Division Ratio (Standard State) | 85 : 15 | 78 : 22 | 90 : 10 | 60 : 40 | 95 : 5 | 100 : 0 | 0 : 100 |
| Product Gas Oxygen Concentration [%] | 93 | | | | | | |
| Product Gas Recovery [Nm³/hr] | 0.0624 | 0.0617 | 0.0622 | 0.0602 | 0.0612 | 0.0586 | 0.0581 |

FIG.5

METHOD OF RECOVERING ENRICHED GASEOUS OXYGEN

TECHNICAL FIELD

The present invention relates to a method of recovering enriched gaseous oxygen from a crude gas containing oxygen by pressure swing adsorption (PSA process).

BACKGROUND ART

Oxygen-rich gas, i.e. gas with a high oxygen concentration, obtained by a PSA process is widely utilized for technical fields which require continuous supply of oxygen, i.e. for electric steel making, water treatment by oxygen aeration, pulp bleaching or ozonizers for example. Recently, also in the technical field of combustion, resort is made to combustion in oxygen-rich gas instead of combustion in the air for melting furnace residues, for providing a lower NOx emission or for enhancing efficiency of chemical reaction for example. Moreover, oxygen-rich gas is widely utilized also in the field of biochemistry such as fermentation.

A typical PSA process is a multi-tower PSA process which utilizes an apparatus provided with at least two adsorption towers. In the multi-tower PSA process, the process steps of adsorption, desorption and pressurization are repeated in each of the adsorption towers. These process steps are performed in the adsorption towers at different timings from each other. Various attempts have been made for the improvement of such a multi-tower PSA process and an apparatus used therefor. For example, JP-A-8-239204 discloses a process in which the pressure in an adsorption tower in which adsorption is finished is utilized for pressuring another adsorption tower.

On the other hand, a single tower PSA process which utilizes an apparatus provided with a single adsorption tower is also known as a process for realizing size-reduction, simplification of the apparatus and initial cost reduction. Various attempts have been made also for the improvement of such a single tower PSA process and an apparatus used therefor with respect to the amount and purity of oxygen gas obtained as a product. For example, JP-A-9-29044 discloses a process in which the gas remaining in the adsorption tower upon finishing the adsorption is recovered in a separately provided recovery tank and is returned to the adsorption tower when the desorption is finished for washing the adsorption tower.

However, with the processes disclosed in the gazettes or with other prior art single tower PSA processes, the recovery of oxygen-rich gas is insufficient and there is still room for improvement.

An object of the present invention, which is conceived under the circumstances described above, is to enhance the recovery of oxygen-rich gas in obtaining oxygen-rich gas by a single tower PSA process.

DISCLOSURE OF THE INVENTION

According to a first aspect of the present invention, there is provided a process for recovering oxygen-rich gas by enriching gaseous oxygen contained in crude gas by a single tower pressure swing adsorption which utilizes a single adsorption tower loaded with an adsorbent. In this process, a cycle is repeated which includes an adsorption step for adsorbing an unnecessary component contained in the crude gas by the adsorbent by introducing the crude gas into the adsorption tower to output oxygen-rich gas from the adsorption tower, a desorption step for desorbing the unnecessary component from the adsorbent by depressurizing the adsorption tower, a washing step for introducing washing gas into the adsorption tower to discharge remaining gas in the adsorption tower, and a pressurization step for raising the internal pressure of the adsorption tower. The desorbing step includes recovering semi-enriched oxygen gas existing in the adsorption tower after the adsorption is finished for retention in a recovery tank. The washing step includes introducing part of the semi-enriched oxygen gas retained in the recovery tank into the adsorption tower as the washing gas while discharging the remaining gas from the adsorption tower. The pressurizing step includes raising the internal pressure of the adsorption tower by introducing the rest of the semi-enriched oxygen gas retained in the recovery tank into the adsorption tower.

Preferably, the adsorption tower has a crude gas inlet and a product gas outlet. In the desorption step, the semi-enriched oxygen gas is recovered into the recovery tank through the product gas outlet, whereas the unnecessary gaseous component desorbed from the adsorbent is discharged through the crude gas inlet.

Preferably, the washing step includes introducing part of the oxygen-rich gas into the adsorption tower as the washing gas while discharging the remaining gas from the adsorption tower.

Preferably, the division ratio between the amount of the semi-enriched oxygen gas to be introduced in the adsorption tower in the washing step and the amount of the semi-enriched oxygen gas to be introduced in the adsorption tower in the pressurization step lies in the range of from 65:35 to 97:3 as calculated on the basis of standard state volume. More preferably, the division ratio lies in the range of from 75:25 to 93:7 as calculated on the basis of standard state volume.

According to a second aspect of the present invention, there is provided another process for recovering oxygen-rich gas by enriching gaseous oxygen contained in crude gas by a single tower pressure swing adsorption which utilizes a single adsorption tower loaded with an adsorbent. In this process, a cycle is repeated which includes an adsorption step for adsorbing an unnecessary component contained in the crude gas by the adsorbent by introducing the crude gas into the adsorption tower for outputting oxygen-rich gas from the adsorption tower, a first desorption step for desorbing the unnecessary component from the adsorbent by depressurizing the adsorption tower for discharging the unnecessary component from the adsorption tower while recovering semi-enriched oxygen gas existing in the adsorption tower for retention in a recovery tank after the adsorption is finished, a second desorption step for desorbing the unnecessary component from the adsorbent out of the adsorption tower by depressurizing the adsorption tower without recovering the semi-enriched oxygen gas, a first washing step for introducing washing gas into the adsorption tower while discharging remaining gas from the adsorption tower, a second washing step for introducing part of the semi-enriched oxygen gas retained in the recovery tank into the adsorption tower while discharging the remaining gas from the adsorption tower, and a pressurization step for raising the internal pressure of the adsorption tower by introducing the rest of the semi-enriched oxygen gas retained in the recovery tank into the adsorption tower.

In the process for recovering oxygen-rich gas according to the present invention, the semi-enriched oxygen gas existing in the adsorption tower after the finishing of adsorption is recovered for utilization both for the washing and the pressurization of the adsorption tower. The inventors have confirmed that such a process enhances the final recovery of the oxygen-rich gas as compared with the case where the recovered semi-enriched oxygen gas is utilized solely for the washing of the adsorption tower or solely for the pressurization of the adsorption tower.

The inventors have confirmed that a high recovery is obtained in the case where the division ratio between the amount of the semi-enriched oxygen gas to be introduced in the adsorption tower in the washing step and the amount of the semi-enriched oxygen gas to be introduced in the adsorption tower in the pressurization step lies in the range of from 65:35 to 97:3, and preferably from 75:25 to 93:7 as calculated on the basis of standard state volume.

Other features and advantages of the present invention will become clearer from the detailed description given below with reference to the accompanying drawings.

BEST MODE FOR CARRYING OUT THE INVENTION

Preferred embodiments of the present invention will be described below with reference to the accompanying drawings.

Figure 1:
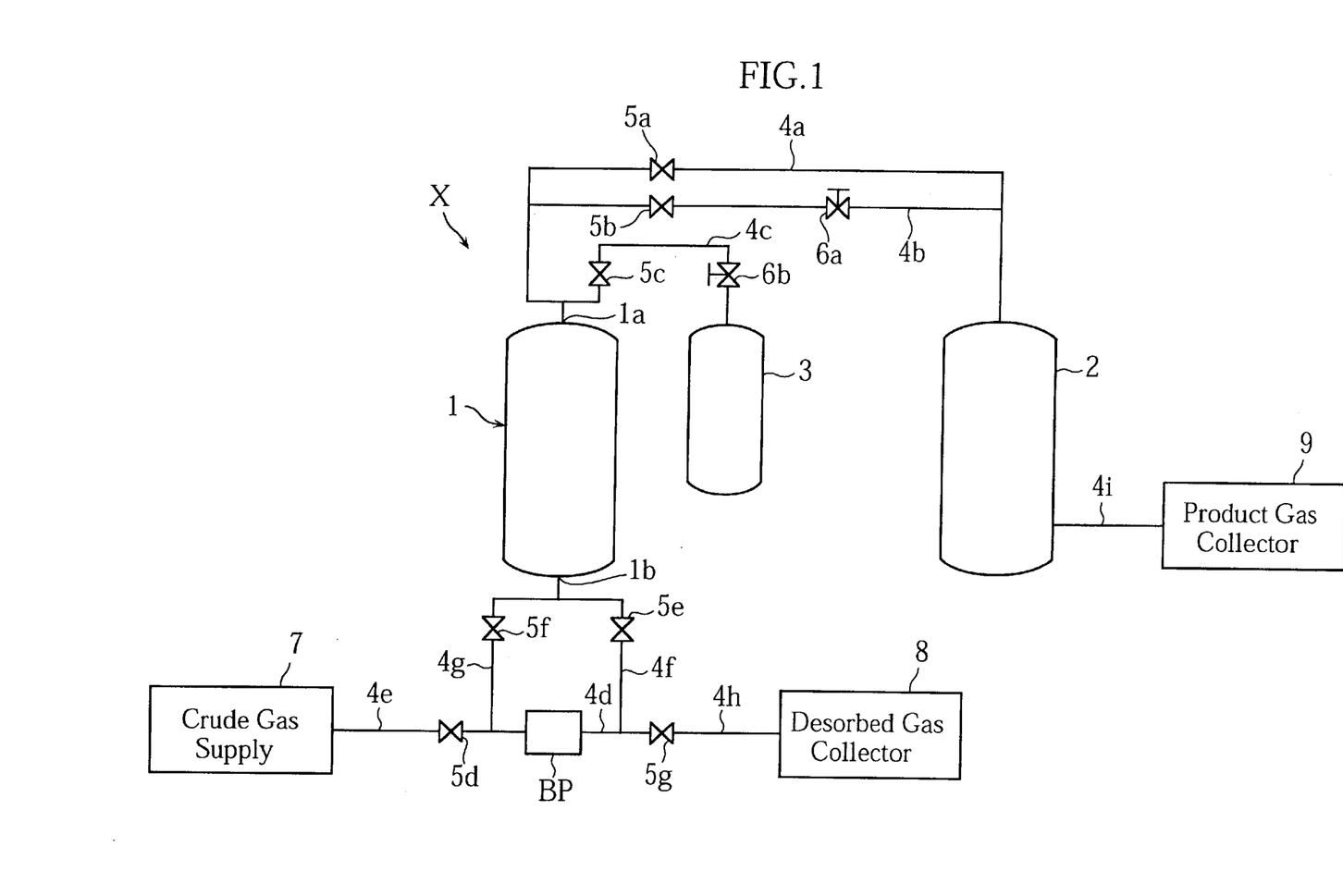
FIG. 1 schematically illustrates a PSA separation apparatus X for realizing an oxygen-rich gas recovering process according to the present invention.

FIG. 1 schematically illustrates a PSA separation apparatus X for realizing an oxygen-rich gas collecting process according to the present invention. The PSA separation apparatus X includes an adsorption tower 1, a product gas buffer tank 2 and a recovery tank 3.

The adsorption tower 1, which includes a product gas outlet 1a and a crude gas inlet 1b, is loaded with an adsorbent. As the adsorbent, use may be made of Li—X type zeolite molecular sieve, Ca—X type zeolite molecular sieve or Ca—A type zeolite molecular sieve for example.

The product gas outlet 1a of the adsorption tower 1 is connected to the product gas buffer tank 2 via a first pipe 4a for product gas collection and via a second pipe 4b for product gas supply. The product gas outlet is also connected to the recovery tank 3 via a third pipe 4c for semi-enriched oxygen gas, which will be described later.

The crude gas inlet 1b of the adsorption tower 1 is connected to a crude gas supply 7 via a common fourth pipe 4d and a fifth and a sixth pipes 4e, 4f for crude gas supply. The crude gas inlet is also connected to a desorbed gas collector 8 via the fourth pipe 4d, and a seventh and an eighth pipes 4g, 4h for desorbed gas discharge.

The product gas buffer tank 2 is connected to a product gas collector 9 via a ninth pipe 4i for product gas collection.

The first pipe 4a for product gas collection is provided with an automatic valve 5a, whereas the second pipe 4b for product gas supply is provided with an automatic valve 5b and a flow rate controlling valve 6a. The third pipe 4c for semi-enriched oxygen gas is provided with an automatic valve 5c and a flow rate controlling valve 6b. The fifth and the sixth pipes 4e, 4f for crude gas supply and the seventh and the eighth pipes 4g, 4h for desorbed gas discharge are provided with automatic valves 5d, 5e, 5f, 5g, respectively. The common fourth pipe 4d is provided with a blower pump BP.

The gas flow in the first through the ninth pipes 4a–4i is controlled by appropriately opening or closing each of the automatic valves 5a–5g. In the adsorption tower 1, a series of process steps including adsorption, desorption, washing and pressurization are repeated a predetermined number of times. The adsorption step is performed under an elevated pressure for adsorbing unnecessary gas by the adsorbent. The desorbing step is performed under a lowered pressure for desorbing the unnecessary gas from the adsorbent. In the washing step, the desorbed gas remaining in the tank is discharged. In the pressurization step, the internal pressure of the adsorption tower 1 is raised in preparation for the adsorption step.

Figure 2:
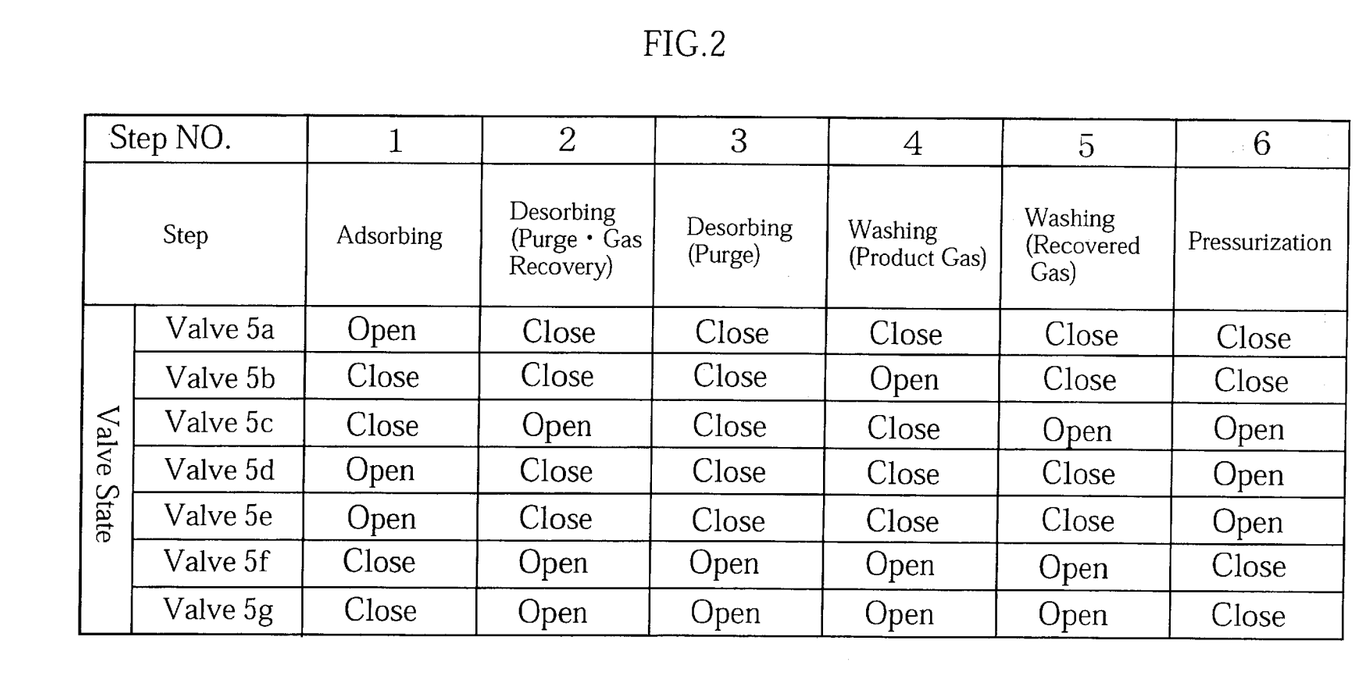
FIG. 2 is a table showing an opened/closed state of each automatic valve of the PSA separation apparatus of FIG. 1 in each step of the oxygen-rich gas recovering process.

According to the embodiment, the PSA separation apparatus X having the above-described structure is utilized for removing unnecessary components from the crude gas for obtaining oxygen-enriched product gas, or oxygen rich gas. In the adsorption tower 1, a cycle including steps 1–6 shown in FIG. 2 is repeated. FIG. 2 also shows the open/close state of each of the valves 5a–5g in each process step. Each of FIGS. 3A–3F illustrates the gas flow in a respective step. The gas flow is indicated by a bold arrow.

Figure 3A:
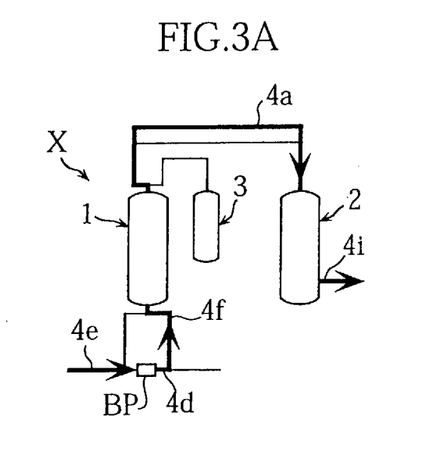
FIGS. 3A–3F illustrate gas flows in respective steps.

In STEP 1, each of the automatic valves 5a–5g is opened or closed as shown in FIG. 2 to provide the gas flow as shown in FIG. 3A, thereby performing adsorption.

As shown in FIGS. 1 and 3A, the adsorption tower 1 communicates with the crude gas supply 7. Further, the adsorption tower 1 communicates also with the product gas collector 9 via the product gas buffer tank 2. Therefore, by the operation of the blower pump BP, the crude gas such as air flows from the crude gas supply 7 through the fifth pipe 4e, the third pipe 4d and the sixth pipe 4f for introduction into the adsorption tower 1 via the crude gas inlet 1b. At this time, the internal pressure of the adsorption tower 1 is held at 30–100 kPa (gauge pressure) for example. In the adsorption tower 1, unnecessary components contained in the crude gas, including nitrogen for example, are adsorbed by the adsorbent for removal. As a result, gas with a high oxygen concentration, i.e. oxygen rich gas, flows out from the adsorption tower 1 via the product gas outlet 1a as a product gas. The product gas is sent to the product gas buffer tank 2 through the first pipe 4a. The product gas is once retained in the product gas buffer tank 2 and then collected in the product gas collector 9 via the ninth pipe 4i. When this process step is finished, part of the product gas remains in the product gas buffer tank 2.

Figure 3B:
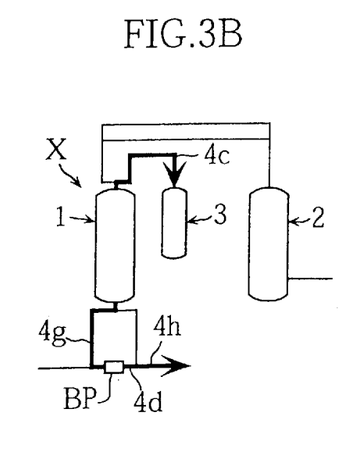

In STEP 2, each of the automatic valves 5a–5g is opened or closed as shown in FIG. 2 to provide the gas flow as shown in FIG. 3B, thereby performing desorption.

As shown in FIGS. 1 and 3B, the adsorption tower 1 communicates with the recovery tank 3. The internal pressure of the adsorption tower 1 is raised to e.g. 30–100 kPa (gauge pressure) due to the adsorption previously performed therein. On the other hand, in the initial stage of this step, the internal pressure of the recovery tank 3 is kept relatively low, which may lie in the range of from −80 to −10 kPa (gauge pressure) for example. Therefore, the gas with a relatively high oxygen concentration existing in the adsorption tower 1, i.e. the semi-enriched oxygen gas moves to the recovery tank 3 through the third pipe 4c due to the pressure difference between the adsorption tower 1 and the recovery tank 3. Due to its previous presence in the adsorption tower upon finishing the adsorption process, this gas has undergone considerable removal of unnecessary components and therefore has a relatively high oxygen concentration. The internal pressure of the recovery tank 3 finally lies in the range of from −50 to 70 kPa (gauge pressure).

In STEP 2, the adsorption tower 1 communicates also with the desorbed gas collector 8. Thus, while the semi-enriched oxygen gas moves to the recovery tank 3, the adsorption tower 1 is depressurized by the operation of the blower pump BP. Therefore, unnecessary components are desorbed from the adsorbent, increasing the unnecessary gas concentration in the adsorption tower 1. By the operation of the blower pump BP, the unnecessary gas flows through the seventh pipe 4g, the fourth pipe 4d and the eighth pipe 4h for collection in the desorbed gas collector 8.

Figure 3C:
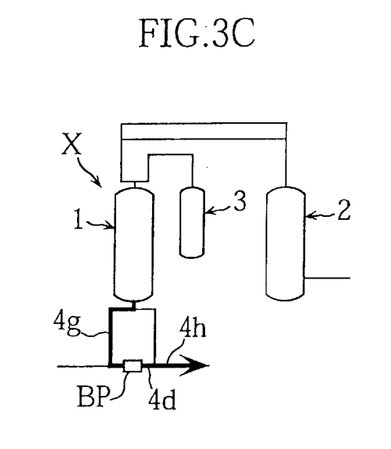

In STEP 3, each of the automatic valves 5a–5g is opened or closed as shown in FIG. 2 to provide the gas flow as shown in FIG. 3C, thereby performing further desorption.

As shown in FIGS. 1 and 3C, the adsorption tower 1 communicates only with the desorbed gas collector 8. The blower pump BP operates continuously from STEP 2 to depressurize the adsorption tower 1, thereby collecting the desorbed gas.

During the desorption in STEPs 2 and 3, the lowest pressure in the adsorption tower 1 lies in the range of from −90 to −20 kPa (gauge pressure).

Figure 3D:
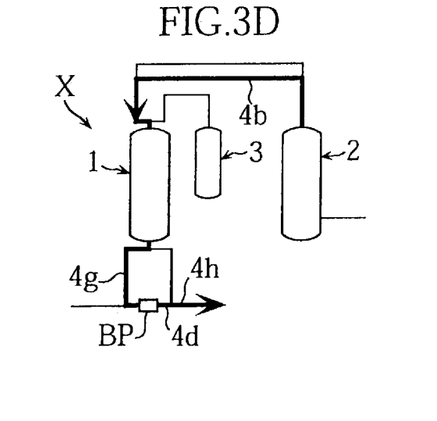

In STEP 4, each of the automatic valves 5a–5g is opened or closed as shown in FIG. 2 to provide the gas flow as shown in FIG. 3D, thereby performing washing.

As shown in FIGS. 1 and 3D, the adsorption tower 1 communicates with the product gas buffer tank 2 and the desorbed gas collector 8. The pressure in the adsorption tower 1, which has undergone the desorption, is relatively low. On the other hand, the pressure in the product gas buffer 2 is relatively high due to the retention of the product gas obtained by the adsorption. Therefore, the product gas moves from the product gas buffer tank 2 through the second pipe 4b for introduction into the adsorption tower 1 via the product gas outlet 1a to serve as washing gas. At this time, the gas within the adsorption tower 1 is continuously sucked by the operation of the blower pump BP. This promotes the movement of the product gas from the product gas buffer tank 2 to the adsorption tower 1. The flow rate and pressure of the product gas flowing from the product gas buffer tank 2 is controlled by the flow rate controlling valve 6a.

The gas sucked from the adsorption tower 1 via the product gas outlet 1a flows through the seventh pipe 4g, the fourth pipe 4d and the eighth pipe 4h for collection in the desorbed gas collector 8. The suction by the operation of the blower pump BP promotes the collection of the remaining gas in the adsorption tower 1. At this time, since the adsorption tower 1 is depressurized and the unnecessary gas is discharged, the concentration of the unnecessary gas or the partial pressure thereof in the adsorption tower 1 is lowered. As a result, the desorption of unnecessary components from the adsorbent is also promoted.

Provided that the suction by the blower pump BP is utilized, the internal pressure of the adsorption tower 1 in the washing step lies in the range of from −90 to −20 kPa (gauge pressure) for example, similarly to that in the desorbing step.

Figure 3E:
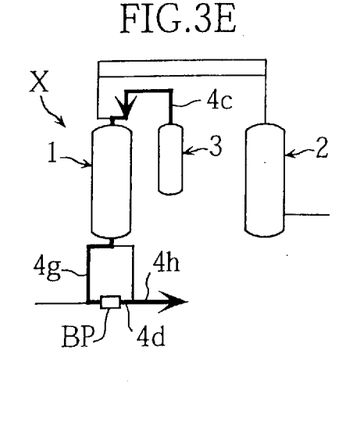

In STEP 5, each of the automatic valves 5a–5g is opened or closed as shown in FIG. 2 to provide the gas flow as shown in FIG. 3E, thereby continuing washing.

As shown in FIGS. 1 and 3E, the adsorption tower 1 communicates with the recovery tank 3 and with the desorbed gas collector 8. As described above, the internal pressure of the recovery tank 3 lies in the range of from −50 to 70 kPa (gauge pressure) for example. On the other hand, the internal pressure of the adsorption tower 1 has been reduced by the blower pump for example to range from −90 to −20 kPa (gauge pressure), which is lower than that of the recovery tank 3. Therefore, due to the pressure difference between the recovery tank 3 and the adsorption tower 1, the semi-enriched oxygen gas in the recovery tank 3 flows through the third pipe 4c for introduction into the adsorption tower 1 via the product gas outlet 1a. At this time, the flow rate and pressure of the semi-enriched oxygen gas flowing from the recovery tank 3 is controlled by the flow rate controlling valve 6b. The remaining gas in the adsorption tower 1 is discharged through the crude gas inlet 1b due to the introduction of the semi-enriched oxygen gas from the recovery tank 3 and due to the suction by the blower pump BP. The discharged gas flows through the seventh pipe 4g, the fourth pipe 4d and the eighth pipe 4h for collection in the desorbed gas collector 8.

At this time, the amount of the semi-enriched oxygen gas introduced from the recovery tank 3 into the adsorption tower 1 may be e.g. 65–97% and more preferably 75–93% (as calculated on the basis of volume under the standard state) of the total amount of the semi-enriched oxygen gas collected from the adsorption tower 1 in the desorbing step (STEP 2). In this step, the final pressure in the adsorption tower 1 may lie in the range of from −80 to −10 kPa (gauge pressure) for example, whereas the final pressure in the recovery tank 3 may lie in the range of from −70 to 0 kPa (gauge pressure) for example.

Figure 3F:
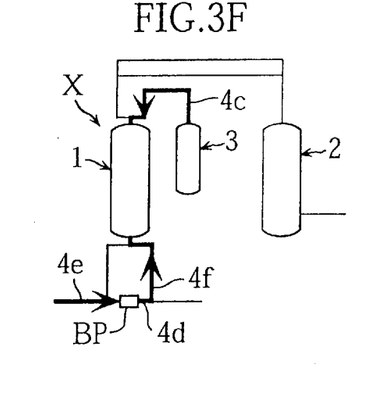

In STEP 6, each of the automatic valves 5a–5g is opened or closed as shown in FIG. 2 to provide the gas flow as shown in FIG. 3F, thereby performing pressurization.

As shown in FIGS. 1 and 3F, the adsorption tower 1 communicates with the recovery tank 3 and with the crude gas supply 7. Following STEP 5, the semi-enriched oxygen gas continues to be introduced from the recovery tank 3 into the adsorption tower 1 through the third pipe 4c. At the same time, the crude gas is supplied from the crude gas supply 7 to the adsorption tower 1 through the fifth pipe 4e, the fourth pipe 4d, the sixth pipe 4f by the operation of the blower pump BP. Therefore, the adsorption tower 1 is pressurized to a range of −60 to 10 kPa for example.

The flow rate and pressure of the semi-enriched oxygen gas flowing from the recovery tank 3 is controlled by the flow rate controlling valve 6b. The amount of semi-enriched oxygen gas introduced from the recovery tank 3 to the adsorption tower 1 may be e.g. 3–35% and more preferably 7–25% (as calculated on the basis of volume under the standard state) of the amount of the semi-enriched oxygen gas collected from the adsorption tower 1 in the desorbing step (STEP 2). Further, the internal pressure of the recovery tank 3 is reduced to the range of from −80 to −10 kPa (gauge pressure).

By repeating the above-described process STEPs 1–6 in the PSA separation apparatus X, oxygen-rich product gas is recovered from the crude gas.

In the embodiment described above, pressurization in STEP 6 is performed by introducing both the semi-enriched oxygen gas and the crude gas. According to the present invention, however, pressurization may be performed only by the introduction of the semi-enriched oxygen gas. In this case, the pressure in the adsorption tower 1 is raised to the final highest value during the adsorption step of STEP 1 by supplying the crude gas to the adsorption tower 1.

Another process step may be included between STEP 6 and STEP 1 for further raising the pressure in the adsorption tower 1 by the introduction of the product gas remaining in the product gas buffer tank 2 into the adsorption tower 1.

Next, examples of the present invention as well as comparative examples will be described.

EXAMPLES 1–5, COMPARATIVE EXAMPLES 1 AND 2

Figure 4:
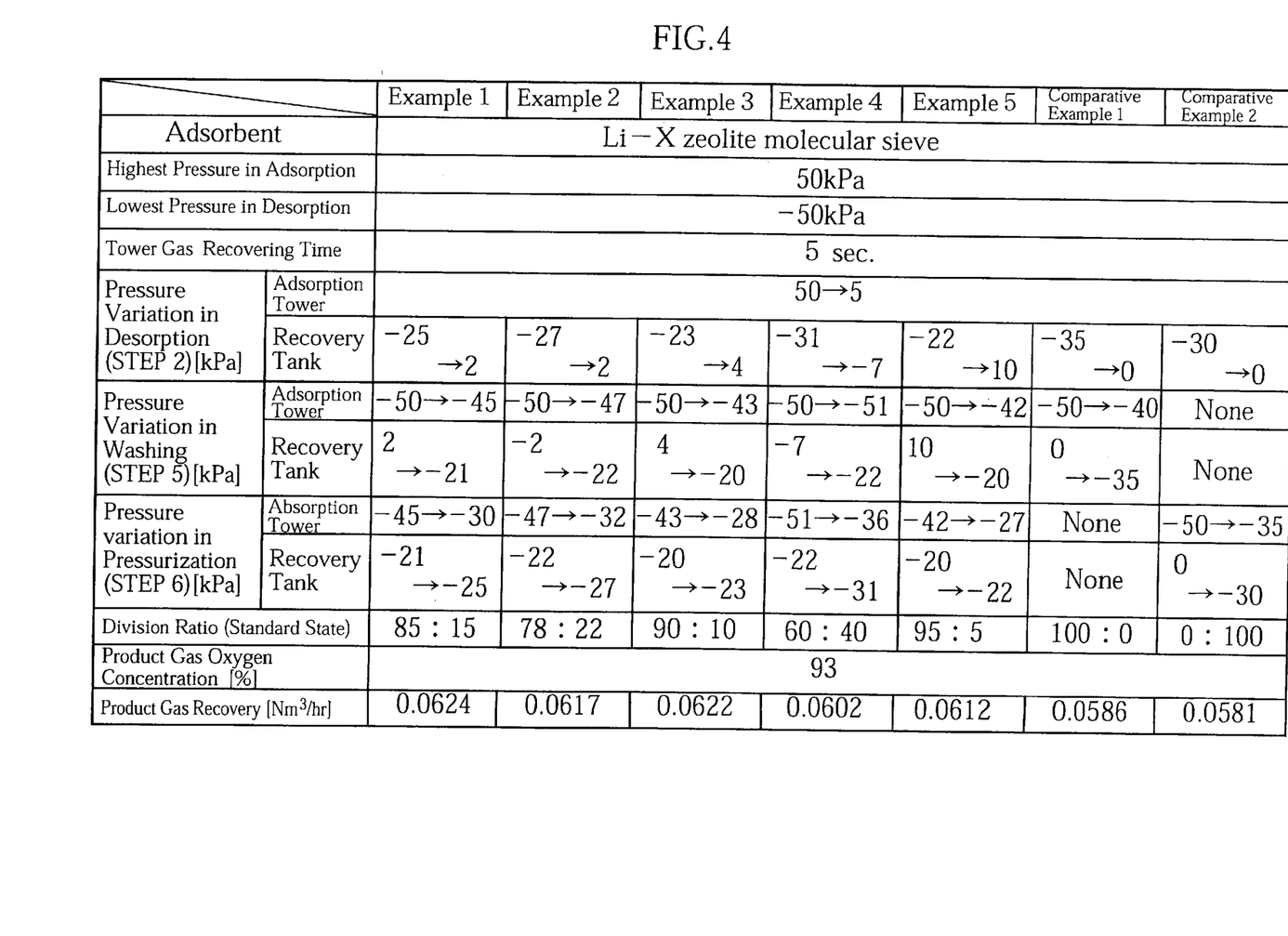
FIG. 4 is a table showing the conditions and data of the examples and comparative examples.

In each of the examples and comparative examples, the cycle consisting of the process steps shown in FIG. 2 is repeated under the conditions shown in FIG. 4 using the PSA separation apparatus X to recover oxygen-rich gas from crude gas. The results are given in FIG. 4 and also represented as a graph in FIG. 5. The abscissa of FIG. 5 is ratio of the amount of the semi-enriched oxygen gas used in the washing step to the amount of the semi-enriched oxygen gas collected in the desorbing step, whereas the ordinate is relative values when the product gas recovery in Example 1 is defined as "1".

Note that all of the examples and the comparative examples are performed under the same conditions, except for differences in the division ratio of the amount of the semi-enriched oxygen gas introduced in the adsorption tower 1 in the washing step 5 to that introduced in the adsorption tower 1 in the pressurization step 6. Due to the differences in the division ratio, the examples and the comparative examples also differ from each other with respect to the internal pressure of the adsorption tower 1 upon finishing the washing step 5, that of the adsorption tower upon finishing the pressurization step 6 and that of the recovery tank 3 upon finishing the washing step 5.

The division ratio as calculated on the basis of volume under the standard state was 85:15 in Example 1, 78:22 in Example 2, 90:10 in Example 3, 60:40 in Example 4, 95:5 in Example 5, 100:0 in Comparative Example 1, and 0:100 in Comparative Example 2. In the Comparative Example 1, the semi-enriched oxygen gas collected in the desorbing step (STEP 2) was totally used in the washing step (STEP 5) and no part of it was used in the pressurization step (STEP 6). In Comparative Example 2, the semi-enriched oxygen gas collected in the desorbing step (STEP 2) was totally used in the pressurization step (STEP 6) and no part of it was used in the washing step (STEP 5).

Figure 5:
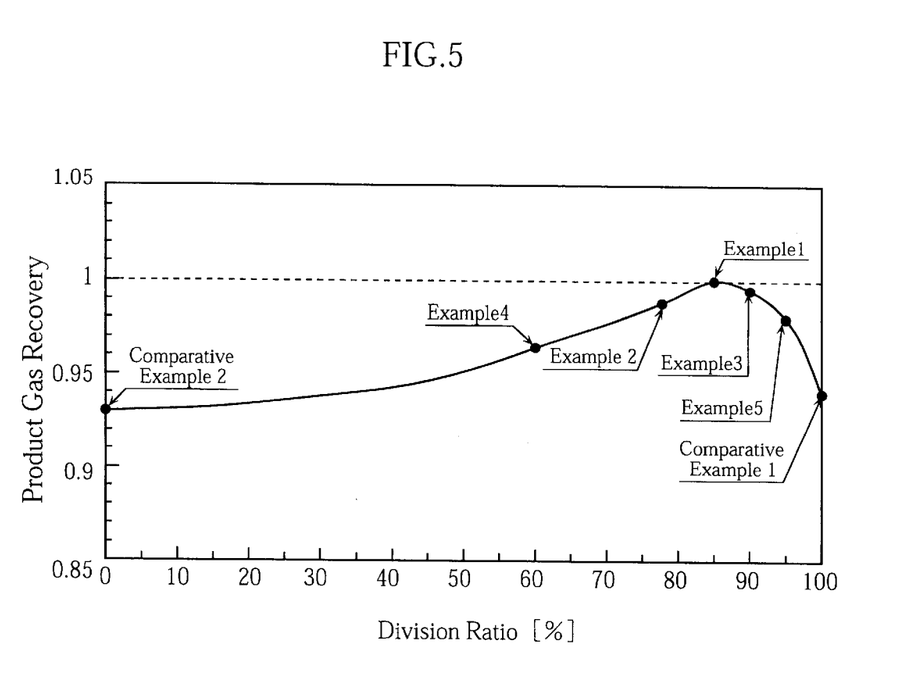
FIG. 5 is a graph showing the results of the examples and comparative examples.

It will be understood, from FIGS. 4 and 5, that a high recovery of the product gas (oxygen-rich gas) is obtained when the division ratio as calculated on the basis of volume under the standard state lies in the range of from 65:35 to 97:3. Further, it will also be understood that a particularly high product gas recovery is obtained when the division ratio as calculated on the basis of volume under the standard state lies in the range of from 75:25 to 93:7.

In this way, according to the present invention, it is possible to enhance the product gas recovery by utilizing the gas in the adsorption tower collected in the desorbing step for both the washing of the adsorption tower and the recovering of the pressure after finishing the desorbing step.

What is claimed is:

1. A process for recovering oxygen-rich gas by enriching gaseous oxygen contained in crude gas by a single tower pressure swing adsorption which utilizes a single adsorption tower loaded with an adsorbent, the adsorption tower having a crude gas inlet and a product gas outlet, the process comprising repeating a cycle which includes:

an adsorption step for adsorbing an unnecessary gas component contained in the crude gas by the adsorbent by introducing the crude gas into the adsorption tower to output oxygen-rich gas from the adsorption tower;

a desorption step for desorbing the unnecessary gas component from the adsorbent by depressurizing the adsorption tower;

a washing step for introducing washing gas into the adsorption tower to discharge remaining gas from the adsorption tower; and a pressurization step for raising internal pressure of the adsorption tower;

wherein the desorbing step includes a first desorption sub-step performed immediately after the adsorption step for recovering semi-enriched oxygen gas existing in the adsorption tower through the product gas outlet for retention in a recovery tank while discharging the unnecessary gas component desorbed from the adsorbent through the crude gas inlet under pressure reduction, and a second desorption sub-step performed immediately after the first desorption sub-step for discharging the unnecessary gas component desorbed from the adsorbent through the crude gas inlet under pressure reduction with the product gas outlet closed;

wherein the washing step includes a first washing sub-step for introducing part of the oxygen-rich gas as the washing gas into the adsorption tower through the product gas outlet while discharging the remaining gas from the adsorption tower through the crude gas inlet, and a second washing sub-step for introducing part of the semi-enriched oxygen gas retained in the recovery tank as the washing gas into the adsorption tower through the product gas outlet while discharging the remaining gas from the adsorption tower through the crude gas inlet; and wherein the pressurizing step includes raising the internal pressure of the adsorption tower by introducing the rest of the semi-enriched oxygen gas retained in the recovery tank into the adsorption tower through the product gas outlet.

2. The process for recovering oxygen-rich gas according to claim 1, wherein a division ratio between an amount of the semi-enriched oxygen gas to be introduced in the adsorption tower in the washing step and an amount of the semi-enriched oxygen gas to be introduced in the adsorption tower in the pressurization step lies in the range of from 65:35 to 97:3 as calculated on a standard state volume basis.

3. The process for recovering oxygen-rich gas according to claim 2, wherein the division ratio lies in the range of from 75:25 to 93:7 as calculated on a standard state volume basis.

4. A process for recovering oxygen-rich gas by enriching gaseous oxygen contained in crude gas by a single tower pressure swing adsorption which utilizes a single adsorption tower loaded with an adsorbent, the process comprising repeating a cycle which includes:

an adsorption step for adsorbing an unnecessary gas component contained in the crude gas by the adsorbent by introducing the crude gas into the adsorption tower to output oxygen-rich gas from the adsorption tower;

a first desorption step performed immediately after the adsorption step for recovering semi-enriched oxygen gas existing in the adsorption tower for retention in a recovery tank while discharging the unnecessary gas component desorbed from the adsorbent under pressure reduction;

a second desorption step for desorbing the unnecessary component from the adsorbent out of the adsorption tower by depressurizing the adsorption tower without recovering the semi-enriched oxygen gas;

a first washing step for introducing part of the oxygen-rich gas as washing gas into the adsorption tower while discharging remaining gas from the adsorption tower;

a second washing step for introducing part of the semi-enriched oxygen gas retained in the recovery tank as washing gas into the adsorption tower while discharging the remaining gas from the adsorption tower; and a pressurization step for raising internal pressure of the adsorption tower by introducing the rest of the semi-enriched oxygen gas retained in the recovery tank into the adsorption tower.

5. The process for recovering oxygen-rich gas according to claim 4, wherein a division ratio between an amount of the semi-enriched oxygen gas to be introduced in the adsorption tower in the washing step and an amount of the semi-enriched oxygen gas to be introduced in the adsorption tower in the pressurization step lies in the range of from 65:35 to 97:3 as calculated on a standard state volume basis.

6. The process for recovering oxygen-rich gas according to claim 5, wherein the division ratio lies in the range of from 75:25 to 93:7 as calculated on a standard state volume basis.

* * * * *